United States Patent
Hoggatt et al.

(10) Patent No.: US 7,605,374 B2
(45) Date of Patent: Oct. 20, 2009

(54) X-RAY DETECTOR FABRICATION METHODS AND APPARATUS THEREFROM

(75) Inventors: Ross Hoggatt, Waukesha, WI (US); Gregory Scott Zeman, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 11/678,561

(22) Filed: Mar. 27, 2007

(65) Prior Publication Data

US 2008/0237477 A1    Oct. 2, 2008

(51) Int. Cl.
*G01T 1/20* (2006.01)
(52) U.S. Cl. .................................. 250/368
(58) Field of Classification Search ............ 250/368, 250/362, 370.11, 370.01, 361 R; 156/67, 156/297, 298, 306.9, 330
See application file for complete search history.

(56) References Cited

U.S. PATENT DOCUMENTS

| | | | |
|---|---|---|---|
| 4,429,227 A | 1/1984 | DiBianca et al. | |
| 5,506,409 A * | 4/1996 | Yoshida et al. | 250/368 |
| 5,533,256 A * | 7/1996 | Call et al. | 29/840 |
| 6,298,113 B1 | 10/2001 | Duclos et al. | |
| 6,541,774 B1 | 4/2003 | DeJule et al. | |
| 7,157,014 B1 | 1/2007 | Andreaco et al. | |
| 2002/0079459 A1* | 6/2002 | Dorscheid et al. | 250/370.11 |
| 2003/0042424 A1* | 3/2003 | Eberhard et al. | 250/370.11 |
| 2003/0128812 A1 | 7/2003 | Appleby et al. | |
| 2003/0128813 A1 | 7/2003 | Appleby et al. | |
| 2005/0156113 A1* | 7/2005 | Suzuki et al. | 250/368 |
| 2006/0033054 A1* | 2/2006 | Yamada | 250/504 R |
| 2006/0131503 A1 | 6/2006 | Freund et al. | |
| 2007/0181252 A1* | 8/2007 | Bohm et al. | 156/297 |

\* cited by examiner

*Primary Examiner*—David P Porta
*Assistant Examiner*—Djura Malevic
(74) *Attorney, Agent, or Firm*—ZPS Group, SC

(57) ABSTRACT

A method of fabricating a detector includes providing a photodiode part, providing a scintillator part, at least one of the photodiode part and the scintillator part including a non-active portion and an active portion, placing a first adhesive such that the first adhesive contacts the active portion when the detector is assembled, placing a second adhesive such that the second adhesive contacts the non-active portion when the detector is assembled, the second adhesive having a faster cure time than the first adhesive, and biasing the photodiode part and the scintillator part toward each other until the second adhesive has cured.

10 Claims, 4 Drawing Sheets

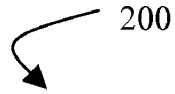

Placing re-work material on a non-active portion of at least one of a scintillator and a photodiode. — 202

Applying an adhesive material to the re-work material and biasing the scintillator and photodiode together. — 204

Removing the re-work material along with the at least partially cured adhesive material. — 206

Applying new re-work material to the non-active portion, and better aligning the scintillator and photodiode before applying the adhesive material to the re-work material, biasing them together again. — 208

X-RAY DETECTOR FABRICATION METHODS AND APPARATUS THEREFROM

BACKGROUND OF THE INVENTION

This invention relates generally to imaging methods and apparatus, and more particularly, to methods and apparatus that provide for improvements in x-ray detector fabrication.

X-ray detectors typically include a photodiode portion and a scintillator portion. An x-ray enters the detector and impinges the scintillator material, wherein photons of visible light are created. The visible light then leaves the scintillator material and impinges a photodiode. The photodiodes are polled, returning attenuation measurements. This data is then used to create images. In assembling a detector (i.e., a photodiode and scintillator array), there are two important components in controlling the cross talk.

Alignment of the scintillator elements to the photodiode active areas is important. Any misalignment of the scintillator portion to the photodiode portion increases the optical cross talk. Cross talk is where one diode receives energy that in a perfect world would have been received in another diode. One way to align the elements is by using fixtures. However, fixture based approaches may not provide adequate alignment capability.

Additionally, it is desirable to assemble detectors using so-called "pick and place" technology. "Pick and place" technology means using robotic arms that move fast and accurately but are also expensive to implement. In order to utilize "pick and place" technology in a cost effective manner the alignment must be "frozen" relatively quickly. By "frozen", it is meant that the two parts are held together strongly enough that the robotic arm can release the picked part and the assembly can undergo typical assembly handling, even though a stronger bond is eventually obtained.

Additionally, the size of the space between the scintillator elements and the photo diode is important, as is the consistency of that spacing. To maximize the light transportation between the scintillator material and the photodiode, an optical coupler material may be used (the optical coupler material reduces any light bouncing back from the surface of the photodiode). Therefore, in addition to providing a non-fixture approach, it is desirable to provide an approach wherein the space between the scintillator material and the photodiode is consistent.

BRIEF DESCRIPTION OF THE INVENTION

In one aspect, a method of fabricating a detector is provided. The method includes providing a photodiode part, providing a scintillator part, at least one of the photodiode part and the scintillator part including a non-active portion and an active portion, placing a first adhesive such that the first adhesive contacts the active portion when the detector is assembled, placing a second adhesive such that the second adhesive contacts the non-active portion when the detector is assembled, the second adhesive having a faster cure time than the first adhesive, and biasing the photodiode part and the scintillator part toward each other until the second adhesive has cured.

In another aspect, a detector assembly includes a scintillator part including an active portion, a photodiode part including an active portion positioned to receive photons emitted from the scintillator part active portion, and a plurality of spacers positioned between the scintillator part active portion and the photodiode part active portion, where the spacers have an index of refraction of at least 1.31.

In yet another aspect, a method includes reducing crosstalk in a detector by placing a plurality of spacers between a scintillator part and a photodiode part, where the spacers have an index of refraction of at least 1.31.

In still yet another aspect, a method includes placing an adhesive with a cure time of at most 75 seconds in an optical path of a scintillator part and a photodiode part of the detector assembly such that the adhesive bonds the scintillator part and the photodiode part together.

BRIEF DESCRIPTION OF THE DRAWINGS

FIG. 5 illustrates a method including the step of placing re-work material on a non-active portion of at least one of a scintillator and a photodiode.

DETAILED DESCRIPTION OF THE INVENTION

There are herein described methods and apparatus useful for imaging systems such as, for example, but not limited to an x-ray system. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of an x-ray system, it is contemplated that the benefits of the invention accrue to all diagnostic imaging systems, all current modalities and/or any modality yet to be developed in which scintillator/photodiode packs are used.

Figure 1:
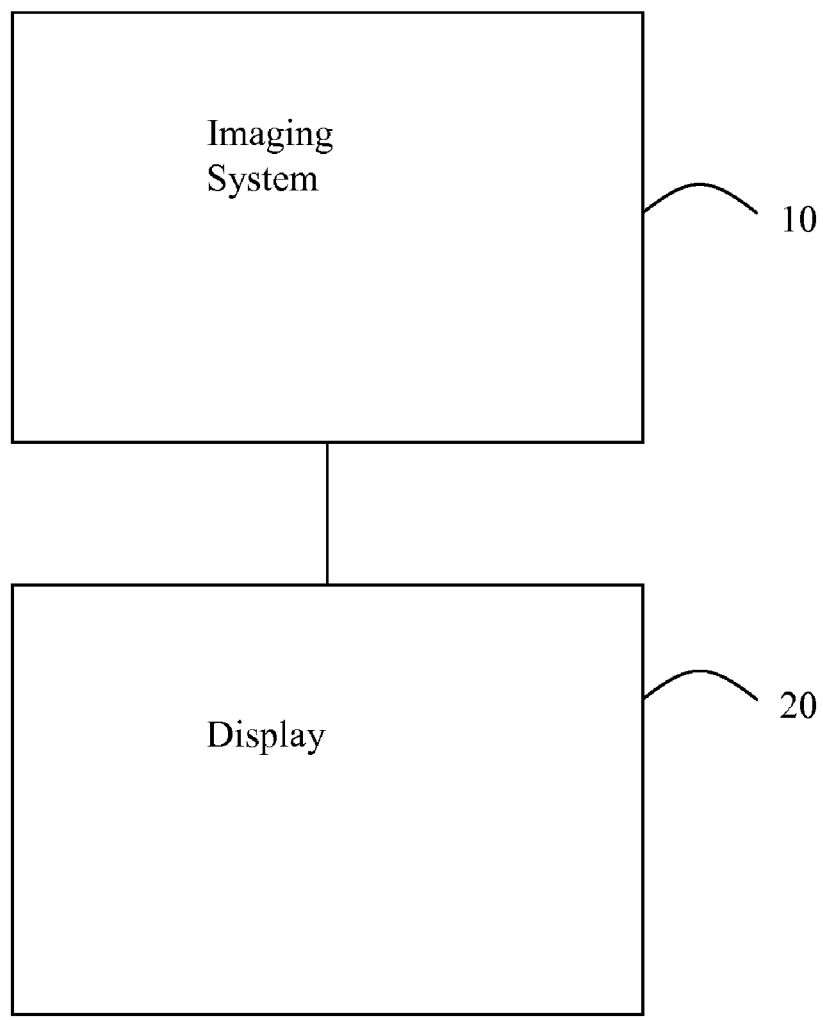
FIG. 1 illustrates an exemplary diagnostic imaging system.

FIG. 1 illustrates an imaging system 10 with an associated display 20. Imaging system 10 can be of any modality, but in one embodiment, system 10 is a CT system. In another embodiment, system 10 is a dual modality imaging system such as a combined CT/PET system and data can be acquired in one modality (e.g., CT) and the processed data can be transferred to the other modality (e.g., PET). Display 20 can be separate from system 10 or integrated with system 10. System 10 includes an acquisition device such as an x-ray radiation detector, The x-ray imaging system includes a processing circuit. The processing circuit (e.g., a microcontroller, microprocessor, custom ASIC, or the like) is coupled to a memory and a display device. The memory (e.g., including one or more of a floppy disk drive, CD-ROM drive, DVD drive, magnetic optical disk (MOD) device, or any other digital device including a network connecting device such as an Ethernet device for reading instructions and/or data from a computer-readable medium, such as a floppy disk, or an other digital source such as a network or the Internet, as well as yet to be developed digital means, and the like) stores imaging data.

The memory may also store a computer program including instructions executed by the processing circuit to implement the functions described herein. The processing circuit provides an image for display on a device. The detector may be a flat panel solid state image detector, for example, although conventional film images stored in digital form in the memory may also be processed. In one embodiment, the processing circuit executes instructions stored in firmware (not shown).

Of course, the methods described herein are not limited to practice in system 10 and can be utilized in connection with many other types and variations of imaging systems. In one embodiment, the processing circuit is a computer that is programmed to perform functions described herein, and, as used herein, the term computer is not limited to just those integrated circuits referred to in the art as computers, but broadly refers to computers, processors, microcontrollers, microcomputers, programmable logic controllers, application specific integrated circuits, and other programmable circuits. Although the herein described methods are described in a human patient setting, it is contemplated that the benefits of the invention accrue to non-human imaging systems such as those systems typically employed in small animal research. Although the herein described methods are described in a medical setting, it is contemplated that the benefits of the invention accrue to non-medical imaging systems such as those systems typically employed in an industrial setting or a transportation setting, such as, for example, but not limited to, a baggage scanning CT system for an airport or other transportation center as shown in FIG. 2.

Figure 2:
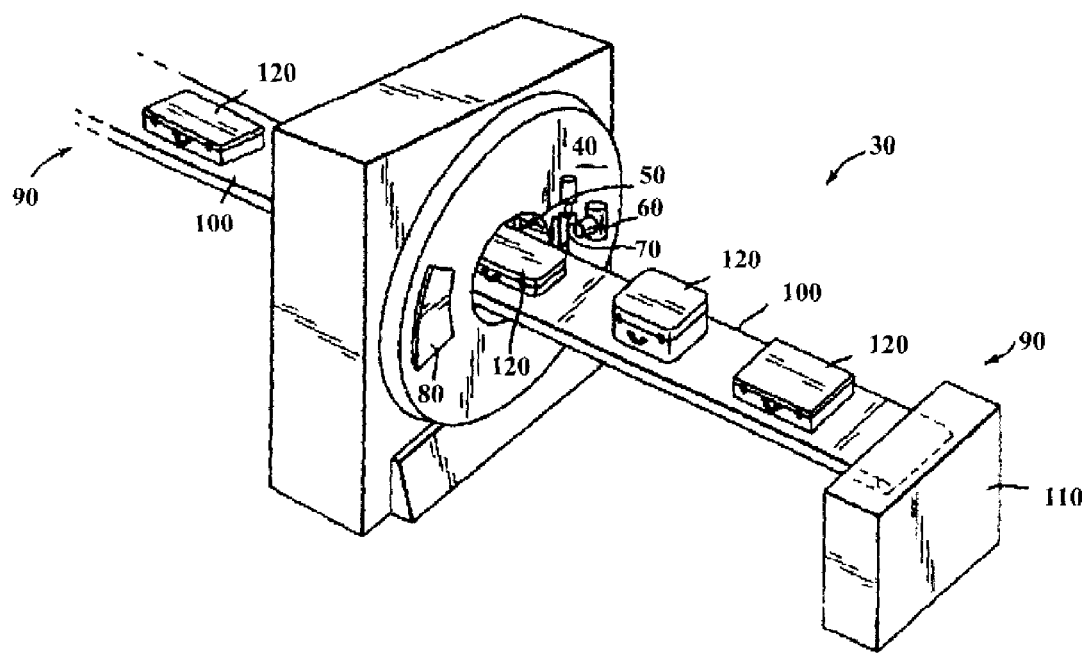
FIG. 2 illustrates a package/baggage inspection system.

Referring now to FIG. 2, a package/baggage inspection system 30 includes a rotatable gantry 40 having an opening 50 therein through which packages or pieces of baggage may pass. The rotatable gantry 50 houses a high frequency electromagnetic energy source 60 aligned with an attenuation filter 70 as well as a detector assembly 80. A conveyor system 90 is also provided and includes a conveyor belt 100 supported by structure 110 to automatically and continuously pass packages or baggage pieces 120 through opening 50 to be scanned. Objects 120 are fed through opening 50 by conveyor belt 100, imaging data is then acquired, and the conveyor belt 100 removes the packages 120 from opening 50 in a controlled and continuous manner. As a result, postal inspectors, baggage handlers, and other security personnel may non-invasively inspect the contents of packages 120 for explosives, knives, guns, contraband, and the like.

Figure 3:
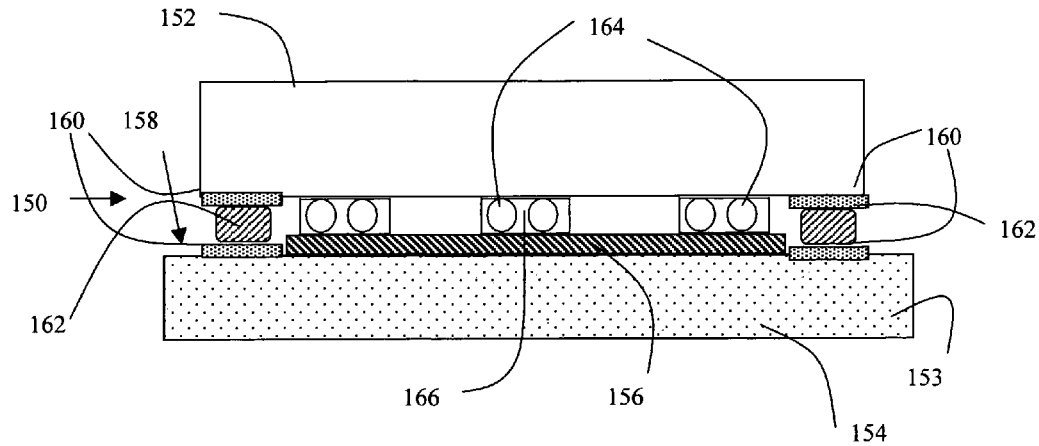
FIG. 3 illustrates a detector assembly including a scintillator part and a photodiode part.

FIG. 3 illustrates a detector assembly 150 including a scintillator part 152 and a photodiode part 153. Photodiode part 153 includes a substrate 154, an active portion 156, and a non-active portion 158. In one embodiment, a re-work material such as an adhesive tape 160 is placed on at least a portion of a non-active portion 158. An adhesive 162 is placed between photodiode part 153 and scintillator part 152. A plurality of spacers 164 provide for proper spacing and alignment of photodiode part 153 with scintillator part 152. An adhesive 166 is placed between active areas of photodiode part 153 and scintillator part 152 surrounding the spacers 164. The spacers may be rods or circular shaped objects, in one embodiment. Additionally, adhesive 162 may be of a faster curing type of adhesive than adhesive 166. The optical qualities of adhesive 162 may also be different than the optical qualities of adhesive 166. For example, the optical qualities of adhesive 162 are unimportant because adhesive 162 is placed in the non-active areas of at least one of scintillator material 152 and photodiode 154. On the other hand, the optical qualities of adhesive 166 are important because this is positioned between active areas of at least one of scintillator material 152 and photodiode 154.

The use of spacers 164 also acts as a gap filler enabling the use of parts that are not ideally flat. As the gap size increases, the amount of optical cross talk increases. Therefore, the use of small sized spacers has the effect of decreasing optical cross talk.

In one embodiment, round balls of a transparent material with a reasonable index of refraction (glass or polystyrene, for one example, another example is any material having an index of refraction of about or greater than 1.31) of uniform size can be mixed into some of the optical coupler material. This material would be dispensed as drops in specific locations on either the scintillator array or the photo diode. When the two parts are assembled together, the balls would maintain the gap between the parts in a controlled manner. The remaining area could then be filled with optical coupler. In other words, the voids shown in FIG. 3 can be filled with adhesive 166.

To freeze the alignment in a manner fast enough to enable the cost effective use of pick and place technology, in one embodiment adhesive 162 is relatively fast acting adhesive that can be used to tack the parts together until the optical coupler (adhesive 166) cured. One such adhesive would be a UV activated higher viscosity adhesive. The higher viscosity would keep this material from moving to unwanted locations, and the UV activation would be fast enough for cost effective use. This tack material would ideally be only placed in a non-active area of the assembly.

However, it is contemplated that the tack material can be placed in the active area as well. If the tack material has the proper optical properties, and cures within a reasonable time, then only a single adhesive may be used. For a typical robotic environment, reasonable times are 60 seconds, 75 seconds, 90 seconds, and even several minutes for a slower production line. Even with a relatively fast curing adhesive in the active area (i.e., in the optical path), two different adhesives may still be employed depending on other factors such as cost, final strength, etc.

In addition, it is possible to dispense a large center bead of optical coupler material with gap controlling beads (spherical balls), and then press the scintillator on the diode assembly. This would result in a void free optical couple and then the two short ends are UV snap cured to hold in place for edge cleaning and placement verification before thermal or UV cure of the entire optical coupler. Of course, there could be voids and instead of pressing the scintillator onto the diode assembly, a diode part can be pressed onto a scintillator part in other embodiments. Some commonalities of most embodiments, is that non-active areas are attached using a quick curing material without regard for optical quality of the material, active areas are coupled with a material where optical characteristics are important, and the material may include sizing members to control the size of the gap between parts such that the gap is substantially uniform, and the material may be slow curing.

To enable re-work before the optical coupler cured a further enhancement could be used if non-active areas are available in the assembly. Re-work material such as a thin film of material, such as a pressure sensitive adhesive tape, could be placed on one or both components in the area where the tack material will be applied. If re-work is required, the parts could be disassembled at the pressure sensitive assembly interface.

Figure 4:
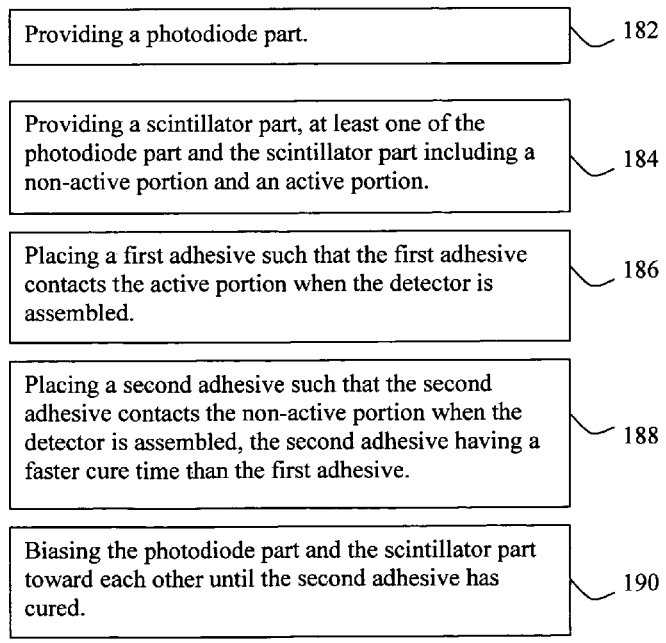
FIG. 4 illustrates a method including the step of providing a photodiode part.

FIG. 4 illustrates a method 180 including the step 182 of providing a photodiode part. Method 180 also includes providing a scintillator part wherein at least one of the photodiode part and the scintillator part includes a non-active portion and an active portion 184. At 186, a first adhesive is placed such that the first adhesive contacts the active portion when the detector is assembled. At 188, a second adhesive is placed such that the second adhesive contacts the non-active portion when the detector is assembled, wherein the second adhesive has a faster curing time than the first adhesive. Lastly, at 190, the photodiode part and the scintillator part are biased toward each other until the second adhesive has cured. As used herein and with regard to the second adhesive, the term cured does not mean totally cured which may take days or weeks, here "cured" means cured strong enough to released by the robotic arm and undergo typical handling in assembly.

FIG. 5 illustrates a method 200 including the step 202 of placing re-work material on a non-active portion of at least one of a scintillator and a photodiode. Step 204 is applying adhesive material to the re-work material and biasing the scintillator and photodiode together. Step 206 is removing the re-work material along with the at least partially cured adhesive material. It should be noted that method 200 is for the case where something went wrong with the initial joining of the scintillator and photodiode. Step 208 is applying new re-work material to the non-active portion and better aligning the scintillator and photodiode before applying adhesive material to the re-work material and biasing together again.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Technical effects include that the herein described methods and apparatus allow for use of spacer balls that do not disrupt the light transmission and enables a more consistent part to part optical cross talk component, reducing the possibility of image artifacts in sloped anatomy. Use of a quick cure adhesive enables more accurate alignment by enabling "pick and place" technology in a cost effective manner. Use of a pressure sensitive adhesive tape enables re-work in case there is an assembly issue, reducing the production cost. Precise adhesive gap thickness is desirable to improve part reliability, reduction of crosstalk variation part to part, and for use in precision glued part stacks where bond line thickness variation affects dimensions of the finished assembly.

Use of these gap setting balls also enables assembling longer parts (scintillator array) since it is more difficult to control flatness as the parts grow longer and this enables handling that issue. Longer parts are one element in getting greater coverage in a single rotation. Desired elements include the use of balls to create the desired gap in a scintillator/photo diode assembly; use of a quick cure adhesive to enable the move from a fixture based alignment approach to a "pick and place" vision based alignment approach and capture this alignment at the appropriate gap until the optical coupler cures; use of tape to enable re-work when desired (easy breaking of quick cure adhesive joint), and using balls of a different index of refraction to "focus" light using lens principles to reduce crosstalk through the optical coupler by ray angle rejection and scatter rejection. In different embodiments, the spacers have an index of refraction of at least 1.31 (ice), at least 1.5 (some glasses), less than about 2.0, (Arsenic trisulfide glass) and/or less than about 1.7 (some dense flint glass). In different embodiments, the spacers have a diameter of between 15 and 60 um in diameter. For a given embodiment the diameter range would be tightly controlled and typically span 5 um.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. A method of fabricating a detector, said method comprising:
   providing a photodiode part;
   providing a scintillator part, at least one said photodiode part and said scintillator part including a non-active portion and an active portion;
   placing a first adhesive such that the first adhesive contacts the active portion when the detector is assembled;
   placing a second adhesive such that the second adhesive contacts the non-active portion when the detector is assembled, the second adhesive having a faster cure time than the first adhesive; and
   biasing said photodiode part and said scintillator part toward each other until the second adhesive has cured.

2. A method in accordance with claim 1 wherein a plurality of balls space said photodiode part from said scintillator part.

3. A method in accordance with claim 2 wherein said balls have an index of refraction of at least 1.31.

4. A method in accordance with claim 3 wherein said second adhesive is UV activated.

5. A method in accordance with claim 1 wherein said second adhesive is UV activated.

6. A method in accordance with claim 1 wherein a plurality of rods space said photodiode part from said scintillator part.

7. A method in accordance with claim 1 further comprising placing re-work tape on at least some of the non-active area.

8. A method in accordance with claim 7 further wherein a plurality of balls space said photodiode part from said scintillator part.

9. A detector assembly comprising:
   a scintillator part including an active portion;
   a photodiode part including an active portion positioned to receive photons emitted from said scintillator part active portion; and
   a plurality of spacers positioned between said scintillator part active portion and said photodiode part active portion, where said spacers have an index of refraction of at least 1.31, wherein both said photodiode part and said scintillator part include non-active portions, said assembly further comprising a first adhesive coupling the active portions together and a second adhesive coupling the non-active portions together, wherein the second adhesive has a faster cure time then the first adhesive.

10. A detector assembly in accordance with claim 9 wherein said spacers are substantially spherical in shape and are fabricated from either glass or polystyrene.

* * * * *